United States Patent Office 3,654,188
Patented Apr. 4, 1972

---

3,654,188
PREPARATION OF SOLID SOLUTIONS COMPRISING A VALVE METAL DIOXIDE AND A PRECIOUS METAL DIOXIDE
James M. Kolb, Mentor, Ohio, assignor to Diamond Shamrock Corporation, Cleveland, Ohio
No Drawing. Filed Sept. 23, 1970, Ser. No. 74,876
Int. Cl. H01b 1/08
U.S. Cl. 252—520     4 Claims

ABSTRACT OF THE DISCLOSURE

A solid solution of a valve metal dioxide and a precious metal dioxide is prepared in bulk form by compacting a mixture of a valve metal with a precious metal salt followed by careful heating in an oxidizing atmosphere.

BACKGROUND OF THE INVENTION

While solid solutions in one form or another have been known for some time, recent years have seen the development and recognition of the useful nature of a specific type of solid solution for electrolytic applications. These solid solutions, primarily composed of mixtures of valve metal and precious metal oxides, are formed and deposited on a conductive base as is described more fully for example in South African Pat. 68/0834. Aondes prepared according to this teaching exhibit properties so superior to prior dimensionally stable anodes that their acceptance has been almost immediate, particularly in the chlor-alkali industry. The properties of these anodes have encouraged investigators to attempt to adopt the solid solutions on which they are based for use in other applications in which the electroconductive and catalytic properties of these materials may be to advantage.

In doing so, however, it has surprisingly and perplexingly been found that, statements to the contrary in the aforementioned South African patent notwithstanding, true solid solutions, particularly valve metal dioxide-precious metal dioxide solid solutions, cannot readily be formed independent of a conductive base. Furthermore it has been found that if, for example, a ruthenium dioxide-titanium dioxide solid solution is desired, it must be formed on a valve metal substrate preferably titanium, other substrates apparently being unable to significantly catalyze the formation of a true solid solution, that is, materials wherein molecules of titanium in the characteristic rutile titanium dioxide crystal lattice are randomly replaced with molecules of ruthenium. Attempts to form such a solid solution on a nickel base, for example, have resulted merely in the formation of loosely adherent physical mixtures of oxides in separate crystalline phases.

Methods of forming solid solution type materials are known in the prior art, see for example U.S. Pats. 3,498,931 and 3,514,414. Such methods, however, have the disadvantage of requiring the use of sealed reaction vessels, vacuums or high pressures, high temperatures and the like and are best suited only to small scale operation.

STATEMENT OF THE INVENTION

Therefore it is an object of the present invention to provide a simple process for the preparation of solid solutions in bulk form.

It is a further object of the present invention to provide a process for the production of valve metal dioxide-precious metal dioxide solid solutions in bulk form independent of supporting substrates.

These and further objects of the present invention will become apparent to one skilled in the art from the description and claims which follow.

It has now been found that a valve metal dioxide-precious metal dioxide solid solution may be formed by:

(a) forming a mixture of a finely-divided valve metal and a salt of a precious metal;
(b) compacting said mixture;
(c) heating said mixture in an oxidizing atmosphere, at a rate less than that which allows oxidazation to occur at an uncontrolled rate, to a final temperature less than that at which phase separation occurs; and
(d) maintaining the final temperature until substantially all of the mixture has oxidized to the oxide.

In this manner there is obtained a substantially pure solid solution in a form which may be easily rendered particulate and used for a variety of purposes, as such, in combination with other ingredients or applied to a supporting and/or conductive base. The process has the advantage that the highly desirable solid solution may be formed independent of the parent valve metal base. Further, the process is superior to other art techniques for forming solid solutions in that extremely high temperatures, sealed tubes, inert atmospheres, pressures, vacuums and the like are not required.

DESCRIPTION OF THE PREFERRED EMBODIMENTS

The solid solutions of the present invention are a mixture of the dioxides of the various valve and precious metals. The term "valve metals" is used in its standard sense to refer to titanium, zirconium, niobium and tantalum metals. The valve metals are employed in a finely-divided metallic form, preferably —325 mesh or less. By the term "precious metal" it is intended to refer primarily to the platinum group metals; platinum, ruthenium, iridium, palladium, rhodium and osmium. These precious metals are employed in a powdered salt form, usually, for convenience and owing to commercial availability, in the form of a hydrated halide, e.g., $RuCl_3 \cdot 2.5H_2O$.

The relative amounts of valve metal and precious metal salt used may be defined in terms of the amount of precious metal oxide which the valve metal oxide crystal lattice will take into a solid solution conforming to the formula $Y_xZ_{1-x}O_2$ wherein Y=precious metal and Z=valve metal. In the case of the $TiO_2$—$RuO_2$ system this varies between 0.01 and 99+%, the molecules being freely interchangeable in the lattice. Within this range the amount of ruthenium actually employed may be varied depending upon the intended use of the solid solution and economic considerations, 20–80% $RuO_2$ being most suitable. Other systems form solid solutions to a more limited extent, in which case excessive amounts will result in the presence of "free" precious metal oxide in the final solid solution.

According to the practice of the present invention the valve metal and the precious metal salt are mixed and the mixture is compacted. The purpose of the compacting step, in addition to providing the mixture in easily handled form, is to bring the metal and the salt into sufficiently close proximity to facilitate the subsequent diffusion reaction. This is conveniently accomplished, for example, by placing the mixture in a conventional pelletizing machine and applying from 5,000 to 10,000 pounds per square inch of pressure.

The compacted mixture is heated in an oxidizing atmosphere, conveniently air, the temperature of the mixture being raised slowly. During this heating step the components of the mixture are oxidized and inter-react to form the desired solid solution. Experience has shown that the temperature of the mixture must be raised gradually in order to control the oxidation rate. If the sample is placed in a pre-heated oven or if the temperature is raised too rapidly, oxidation will occur with explosive violence. Thus the rate of temperature increase is that consistent with a rapid, yet controlled, reaction. Generally it has been found that a temperature increase from ambient at a rate of 15°–20° C. per hour is satisfactory. The final temperature to which the mixture is raised is that at which complete oxidation and inter-action occur and will vary somewhat depending upon the nature of the materials involved. For most valve metal oxide-precious metal oxide solid solutions, particularly for the $TiO_2$—$RuO_2$ system, a final temperature on the order of 450° C. has been found sufficient. Although by the time this temperature is reached, if the rate of temperature increase has been relatively slow, the reaction will be substantially complete, to insure this completeness under varying conditions it is often desirable to hold the sample at the final temperature for a period of from 1–24 hours. A temperature higher or lower than approximately 450° C., depending on the precious metal involved, may be desirable to insure completeness of reaction on the one hand or prevent volatilization on the other. An upper temperature limit is imposed, however, by the fact that at extreme temperatures the solid solution will tend to undergo phase separation therefore defeating the purpose of the invention. Again with the $TiO_2$—$RuO_2$ system for example, it has been found that temperatures in excess of 550–600° C. are to be avoided.

The sample, now in the desired solid solution form, may be removed from the oven upon cooling and is found to be dry and easily converted into a powder useful in a variety of applications.

For example, it has been found that electrical resistors or predictable degrees of resistivity are readily formed by varying the relative amounts of valve and precious metal components, the relationship between the mole percent of precious metal present and the electrical conductivity being a reproducible function. This property also makes the solid solutions of the present invention useful in the manufacture of capacitors and other electronic components.

The solid solutions have also proven useful as nonspecific oxidation catalysts for gaseous phase reactions. The catalytic activity of the solid solutions appears extremely high and use of these materials as exhaust emission control catalysts is suggested.

In addition, owing to their excellent electroconductivity and electrocatalytic activity, the solid solutions are useful in a number of electrochemical applications especially in view of the fact that they may be applied to a variety of supporting and conducting substrates, which was not true in previous electrochemical applications where their use on a substrate of the parent valve metal was usually dictated. Use in fuel cell applications is particularly promising.

In order that those skilled in the art may more readily understand the present invention, the following specific example is afforded.

EXAMPLE

One gram of titanium metal of a particle size passing through −325 mesh is mixed with 5 grams of $$RuCl_3 \cdot 2.5H_2O$$

(1:1 mole ratio Ti:Ru) and compacted into a disc ⅛ by 1.0 inch. The disc is placed into a crucible furnace through which air is freely circulated and the temperature is raised over a 24 hour period in 10° C. increments to a final temperature of 450° C., at which temperature it is held for 45 minutes. The furnace is then turned off and the sample allowed to cool under continued air circulation whereupon it is removed and submitted for X-ray analysis which finds the material to be a substantially pure rutile form solid solution of titanium and ruthenium dioxides, no anatase and merely a trace of titanium metal being present.

I claim:

While the invention has been described with reference to certain preferred embodiments and techniques, it is not to be so limited since changes and alterations may be made therein which are fully within the intended scope of the appended claims.

1. A method of preparing a valve metal dioxide-precious metal dioxide solid solution which comprises:
    (a) forming a mixture of a finely-divided valve metal and a salt of a precious metal;
    (b) compacting said mixture;
    (c) heating said mixture in an oxidizing atmosphere, at a rate less than that which allows oxidation to occur at an uncontrolled rate, to a final temperature less than that at which phase separation occurs and
    (d) maintaining the final temperature until substantially all of the mixture has oxidized to the dioxide.

2. A method as in claim 1 wherein the valve metal is titanium and the precious metal is ruthenium.

3. A method as in claim 1 wherein the valve metal is titanium and the precious metal is ruthenium and is present in the range of 20–80%, on an $RuO_2$ basis, in the solid solution.

4. A method as in claim 1 wherein the final temperature is about 450° C.

References Cited

UNITED STATES PATENTS

| 3,414,371 | 12/1968 | Rogers | 23—50 R |
| 3,498,931 | 3/1970 | Rogers et al. | 252—518 |
| 3,514,414 | 5/1970 | Shannon | 23—50 RX |
| 3,562,008 | 2/1971 | Martinsons | 117—221 |

JOHN T. GOOLKASIAN, Primary Examiner

J. C. GIL, Assistant Examiner

U.S. Cl. X.R.

23—50 R, 203 R; 106—39 R; 117—221; 204—291; 252—518